Oct. 19, 1954 L. J. CONN 2,692,127

MATERIAL BLENDER

Filed Aug. 7, 1953

INVENTOR.
Leroy J. Conn

BY

McMorrow, Berman & Davidson
ATTORNEYS

Patented Oct. 19, 1954

2,692,127

UNITED STATES PATENT OFFICE 2,692,127

MATERIAL BLENDER

Leroy J. Conn, Warren, Pa.

Application August 7, 1953, Serial No. 373,011

1 Claim. (Cl. 259—134)

This invention relates to a material blender and has for its primary object to thoroughly mix and blend materials of differing characteristics.

Another object is to blend liquids of different specific gravities to produce a uniform product without applying destructive forces to the materials.

The above and other objects may be attained by employing this invention which embodies among its features a disk adapted to rotate about an axis, said disk having circumferentially spaced openings extending therethrough, and material deflecting hoods carried by the disk and extending across the openings for directing materials through the openings and from one side of the disk to the other.

Other features include circumferentially spaced radial slits extending through the disk and having depressions therein adjacent the slits which define with the slits openings which extend through the disk and hoods which deflect material on one side of the disk through the openings to the other side of the disk, and deflectors carried by the disk and extending outwardly from the side thereof remote from the hoods in advance of the openings.

Figure 1:
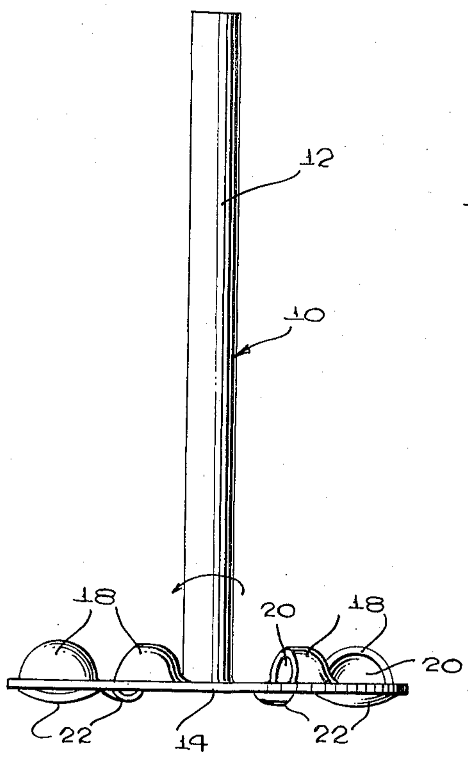
Figure 1 is a side view of a blender embodying the features of this invention.
Figure 2:
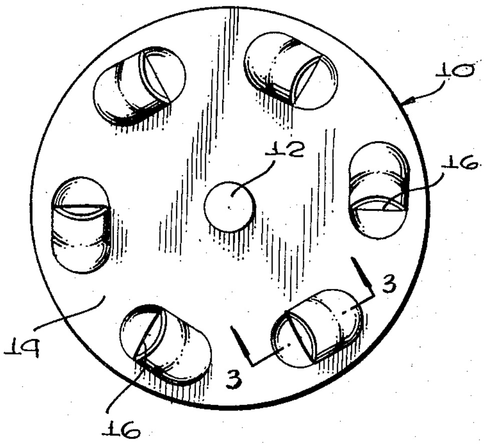
Figure 2 is a top plan view of the blender illustrated in Figure 1.
Figure 3:
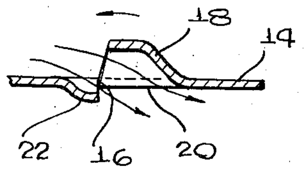
Figure 3 is an enlarged sectional view taken substantially on the line 3—3 of Figure 2.

Referring to the drawings in detail, this improved blender designated generally 10 comprises a spindle 12 carrying adjacent one end an outwardly extending annular disk 14. This disk is provided at circumferentially spaced intervals with radial slits 16, and that portion of the disk on one side of each slit is pressed upwardly therefrom on the side of the disk adjacent the spindle to define a hood 18 and form an opening 20 through the disk through which material is propelled when the disk is rotated around the axis of the spindle 12. Carried by the disk adjacent each slit 16 is a deflector 22 which extends outwardly from the side of the disk 14 remote from the hood 18 in advance of an adjacent opening 20. These deflectors 22 serve to further agitate the material being blended and tends to depress the material adjacent the disk immediately in advance of the introduction of the material on the opposite side of the disk into that on the side of the disk adjacent the deflectors 22.

In use with the disk 14 introduced into the material to be blended below the top surface thereof, it will be evident that upon turning the spindle 12, the blender 10 will rotate to cause material on one side of the disk to enter the openings 20 by reason of the deflection of the material by the hoods 18. At the same time the deflectors 22 will serve to prepare the material on the side of the disk remote from the hoods 18 for receiving the material being forced through the openings 20.

Obviously, by rotating the disk 14 at a selected speed while it is submerged in either a dry or wet material, the substances worked on may be blended, homogenized or masticated according to the wishes of the user.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A material blender comprising a spindle adapted to rotate about its longitudinal axis, a disk carried by the spindle to rotate therewith, said disk having circumferentially spaced openings extending therethrough, material deflecting hoods carried by the disk and extending across the openings for directing material through the openings and from one side of the disk to the other, and deflectors carried by the disk and extending outwardly from the side thereof remote from the hoods in advance of the openings.

References Cited in the file of this patent

UNITED STATES PATENTS

| Number | Name | Date |
|---|---|---|
| 1,304,349 | Moore et al. | May 20, 1919 |
| 1,516,792 | Ruggles | Nov. 25, 1924 |
| 1,582,518 | Harrell | Apr. 27, 1926 |
| 2,035,333 | Mills | Mar. 24, 1936 |
| 2,544,374 | Wotring | Mar. 6, 1951 |